United States Patent
Fung et al.

(10) Patent No.: US 10,860,803 B2
(45) Date of Patent: Dec. 8, 2020

(54) SYSTEM FOR SEMANTIC DETERMINATION OF JOB TITLES

(71) Applicants: Solomon Fung, San Francisco, CA (US); Soumyadeb Mitra, San jose, CA (US); Abishek Kashyap, San Jose, CA (US); Arunim Samat, San Francisco, CA (US); Venkat Nagaswamy, San Francisco, CA (US); Justin Driemeyer, San Carlos, CA (US)

(72) Inventors: Solomon Fung, San Francisco, CA (US); Soumyadeb Mitra, San jose, CA (US); Abishek Kashyap, San Jose, CA (US); Arunim Samat, San Francisco, CA (US); Venkat Nagaswamy, San Francisco, CA (US); Justin Driemeyer, San Carlos, CA (US)

(73) Assignee: 8x8, Inc., Campbell, CA (US)

( * ) Notice: Subject to any disclaimer, the term of this patent is extended or adjusted under 35 U.S.C. 154(b) by 68 days.

(21) Appl. No.: 15/968,751

(22) Filed: May 2, 2018

(65) Prior Publication Data

US 2018/0341639 A1 Nov. 29, 2018

Related U.S. Application Data

(60) Provisional application No. 62/502,707, filed on May 7, 2017.

(51) Int. Cl.
| | | |
|---|---|---|
| G06F 40/30 | (2020.01) | |
| G06Q 30/02 | (2012.01) | |
| G06Q 10/06 | (2012.01) | |
| G06F 16/951 | (2019.01) | |
| G06N 3/04 | (2006.01) | |
| G06K 9/62 | (2006.01) | |
| G06Q 10/10 | (2012.01) | |
| G06N 3/08 | (2006.01) | |
| G06N 5/04 | (2006.01) | |

(52) U.S. Cl.
CPC ............ *G06F 40/30* (2020.01); *G06F 16/951* (2019.01); *G06K 9/6248* (2013.01); *G06N 3/0445* (2013.01); *G06N 3/0454* (2013.01); *G06Q 10/067* (2013.01); *G06Q 10/105* (2013.01); *G06Q 30/0276* (2013.01); *G06N 3/084* (2013.01); *G06N 3/088* (2013.01); *G06N 5/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,917,952 B1 * | 7/2005 | Dailey | ................ | G06F 17/2715 |
| 7,555,441 B2 * | 6/2009 | Crow | ................ | G06Q 10/0631 |
| | | | | 705/7.14 |

(Continued)

*Primary Examiner* — Abdelali Serrou
(74) *Attorney, Agent, or Firm* — Crawford Maunu PLLC

(57) ABSTRACT

A system is described which accepts corporate title and employee data associated with that corporate title data at a first company, putting the corporate title and employee data through a configured network and generating a vector of terms and a set of coefficients associated with that title. Information about an employee is put through a second network using those terms and coefficients to determine if the employee would have the same or similar title at the first company.

18 Claims, 5 Drawing Sheets

(56) References Cited

U.S. PATENT DOCUMENTS

| | | | | |
|---|---|---|---|---|
| 8,244,551 | B1* | 8/2012 | Mund | G06Q 10/10 705/1.1 |
| 8,429,103 | B1* | 4/2013 | Aradhye | G06N 20/00 706/12 |
| 9,342,592 | B2* | 5/2016 | Giverts | G06F 16/90344 |
| 9,558,271 | B1* | 1/2017 | Sathe | G06F 16/367 |
| 10,346,444 | B1* | 7/2019 | Heitman | G06F 16/211 |
| 10,515,623 | B1* | 12/2019 | Grizzel | G10L 15/187 |
| 2001/0034630 | A1* | 10/2001 | Mayer | G06Q 10/063112 705/7.14 |
| 2002/0042786 | A1* | 4/2002 | Scarborough | G06Q 10/10 706/21 |
| 2003/0120630 | A1* | 6/2003 | Tunkelang | G06F 16/2455 |
| 2005/0080657 | A1* | 4/2005 | Crow | G06Q 10/063112 705/7.14 |
| 2012/0254143 | A1* | 10/2012 | Varma | G06F 40/30 707/706 |
| 2015/0161567 | A1* | 6/2015 | Mondal | G06Q 10/1053 705/321 |
| 2015/0317610 | A1* | 11/2015 | Rao | G06Q 10/10 705/321 |
| 2016/0196619 | A1* | 7/2016 | Merhav | G06F 40/284 705/319 |
| 2016/0378865 | A1* | 12/2016 | Makhani | G06F 16/9535 707/721 |
| 2017/0032326 | A1* | 2/2017 | Zhao | G06Q 10/105 |
| 2018/0107982 | A1* | 4/2018 | Arya | G06Q 10/1053 |
| 2018/0165696 | A1* | 6/2018 | Bessen | G06F 40/30 |
| 2018/0173802 | A1* | 6/2018 | Grover | G06F 16/248 |
| 2018/0232562 | A1* | 8/2018 | Cambor | G06K 9/00288 |
| 2018/0247214 | A1* | 8/2018 | Ganjoo | G06N 7/005 |
| 2019/0163737 | A1* | 5/2019 | Zhou | G06F 40/242 |
| 2019/0362233 | A1* | 11/2019 | Aizawa | G06N 3/084 |

* cited by examiner

SYSTEM FOR SEMANTIC DETERMINATION OF JOB TITLES

This application is a continuation of "A System for Semantic Determination of Job Titles", Application No. 62/502,707, a provisional application filed on May 7, 2017.

FIELD OF THE INVENTION

The present invention generally relates to the analysis of corporate data to determine the relationship of a job title to the actual work that a person does, thus relate job titles within a company and across companies with each other.

Companies give people titles which have little meaning between companies. For instance, a vice-president would be a high-level manager in many consumer companies, while in a bank it seems like everyone about a teller is given the title of vice-president.

When trying to determine whether or not someone fits into a specific category of skilled worker, a human resource program might scan a resume and/or job description for keywords, but keywords alone do not resolve this as different job description may use different words to mean roughly the same thing.

What is needed is a system for determining the semantic relationship of job titles within a company by comparing the skills associated with an individual's resume or job description within and across companies.

SUMMARY

A system is described which accepts corporate and employee data from one or more companies and calculates the semantic relationship of one or more job titles to each other.

DETAILED DESCRIPTION OF PREFERRED EMBODIMENTS

Figure 1:
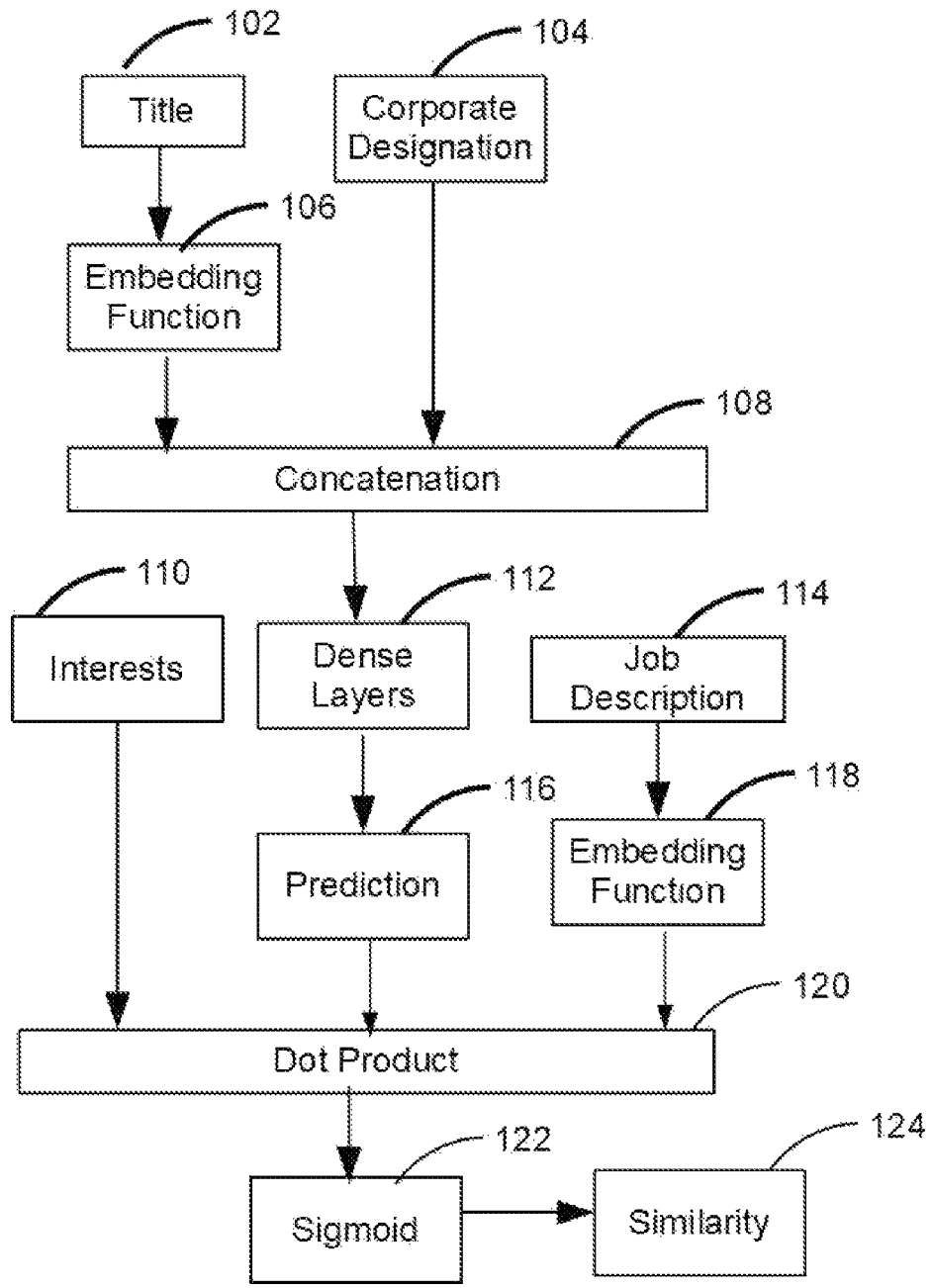
FIG. 1 shows one or more embodiments of a workflow of how the system is trained.

FIG. 1 shows one or more embodiments of the model used to train the classifier. The title 102, a corporate designator associating the title with a specific corporate entity 104, and the description information are input to the model. The description is put through an embedding function 118 before being input into the classifier. In other embodiments, a type of recurrent neural network classifier called LSTM is used as the embedding function 118.

Figure 4:
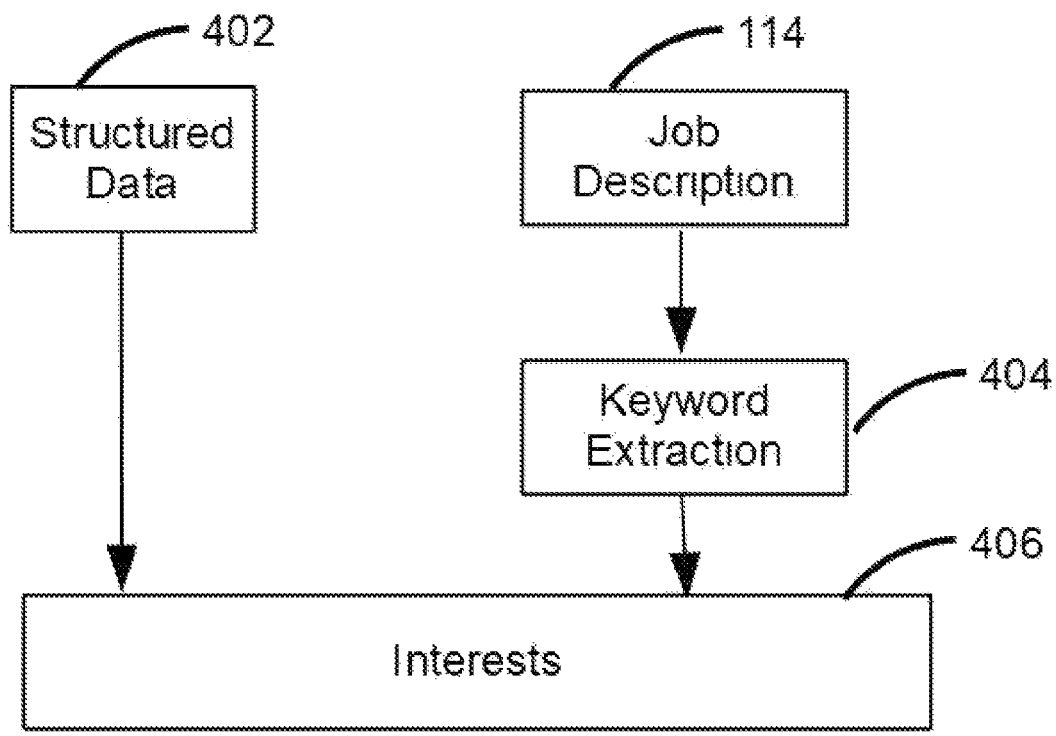
FIG. 4 shows one or more embodiments of how the interests are generated.

Job title, description and employee profile information is collected from one or more companies. A title vector is created which defines how that title 102 is related to each specific corporate designation 104. Job description information 114 such as job description and employee profile information is put through a training process as shown in FIG. 4, such that the words within the description and employee information are associated with a weight. As the relationship of the title to the actual role varies based on the corporate designation, the title information after the embedding function 106 and the corporate designation 104 are concatenated 108 as a single vector for further processing. In one or more embodiments, the weighted values are passed through a recurrent neural network classifier 112 with the resultant prediction 116 compared to the known title vector. In other embodiments, a type of recurrent neural network classifier called LSTM is used as the embedding function 106. In one or more embodiments, the weights are changed using backpropagation and the classifier is run again to obtain a good fit. This process is repeated for all of the provided title vector and description information to obtain the best possible fit given the input training data. To determine a similarity value for a specific role within a corporate entity, interests associated with the job title 110 and the embedding function output 118 associated with the job description information 114 are passed through a dot product 120. The output of the dot product 120 is passed through a sigmoid function 122 to produce a similarity value 124.

Figure 2:
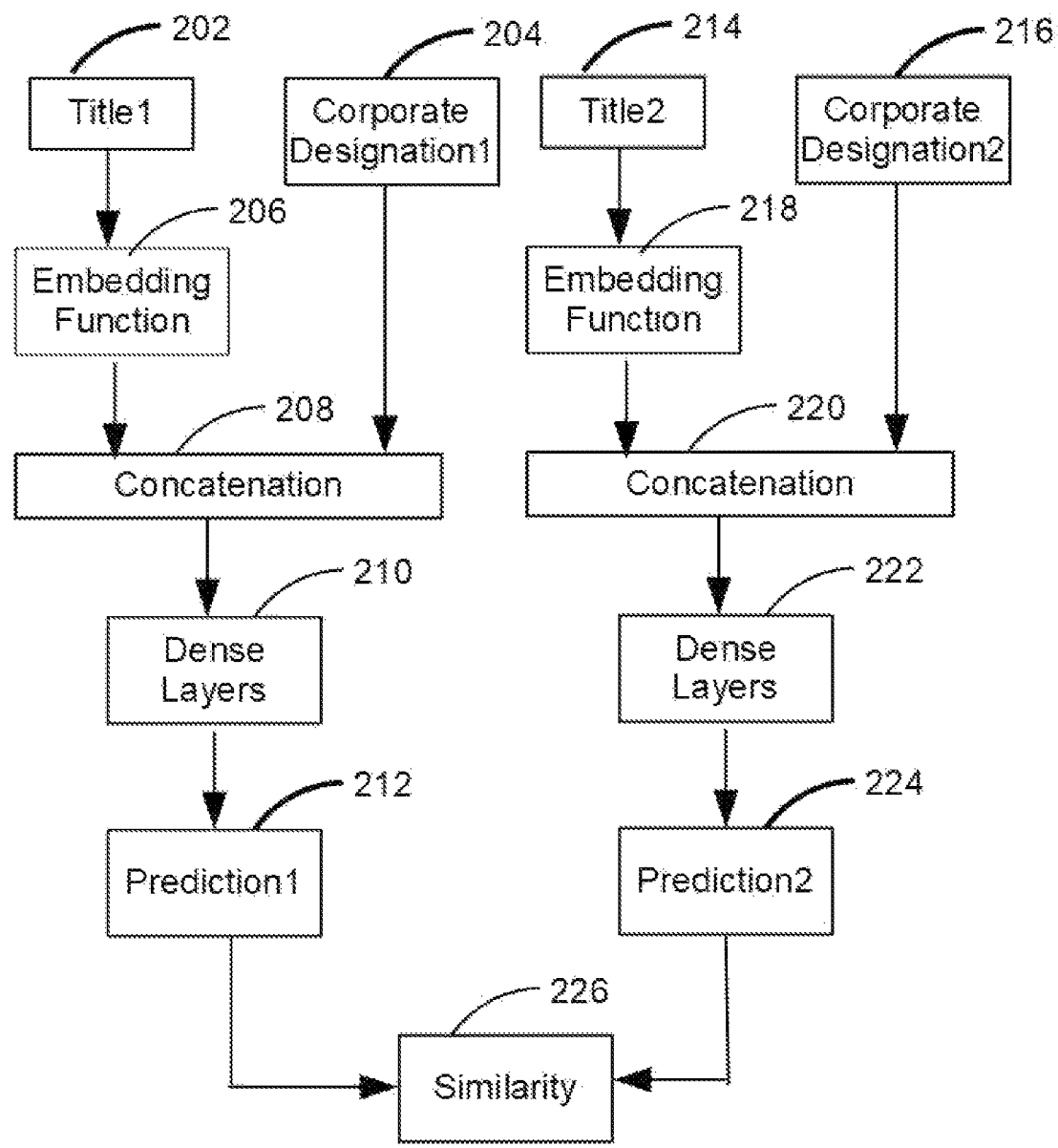
FIG. 2 shows one or more embodiments of how the system is used to predict the relationships between job titles

Once the system is trained, it can be used against other sets of title vector and description information pairs as shown in FIG. 2. The goal here is to use the predictor to see if the job titles are semantically similar based on the predictions.

FIG. 2 shows the system needed to compare two descriptions to see if they are associated with the same or similar roles at companies. The first title 202 is put through a first embedding function 206. In one or more embodiments, a type of recurrent neural network classifier called LSTM is used as the first embedding function 206. The output of the first embedding function 206 is concatenated 208 with the first corporate designation 204 to produce a single output vector. A first classifier 210 trained on weights associated with the trained system 110 is used to predict the role 212 associated with the first title 202. In one or more embodiments, the first classifier 210 is a sequence of dense layers with pooling. A second title to compare it with 214 is put through a second embedding function 218. The output of the second embedding function 218 is concatenated with the second corporate designation associated with the second title 216. The concatenation layer 220 is followed by a second classifier 222 to predict what role it is associated with 224. In one or more embodiments, a type of recurrent neural network classifier called LSTM is used as the second embedding function 218. The two predictions are compared using a similarity function 226. In one or more embodiments, the second classifier 222 is a sequence of dense layers with pooling. In one or more embodiments, this similarity function 226 is the Euclidian distance between the two prediction vectors. In other embodiments, it is the cosine similarity between the two prediction vectors. Other information regarding cosine similarity may be found at Wikipedia® as entered on May 4, 2017.

Figure 3:
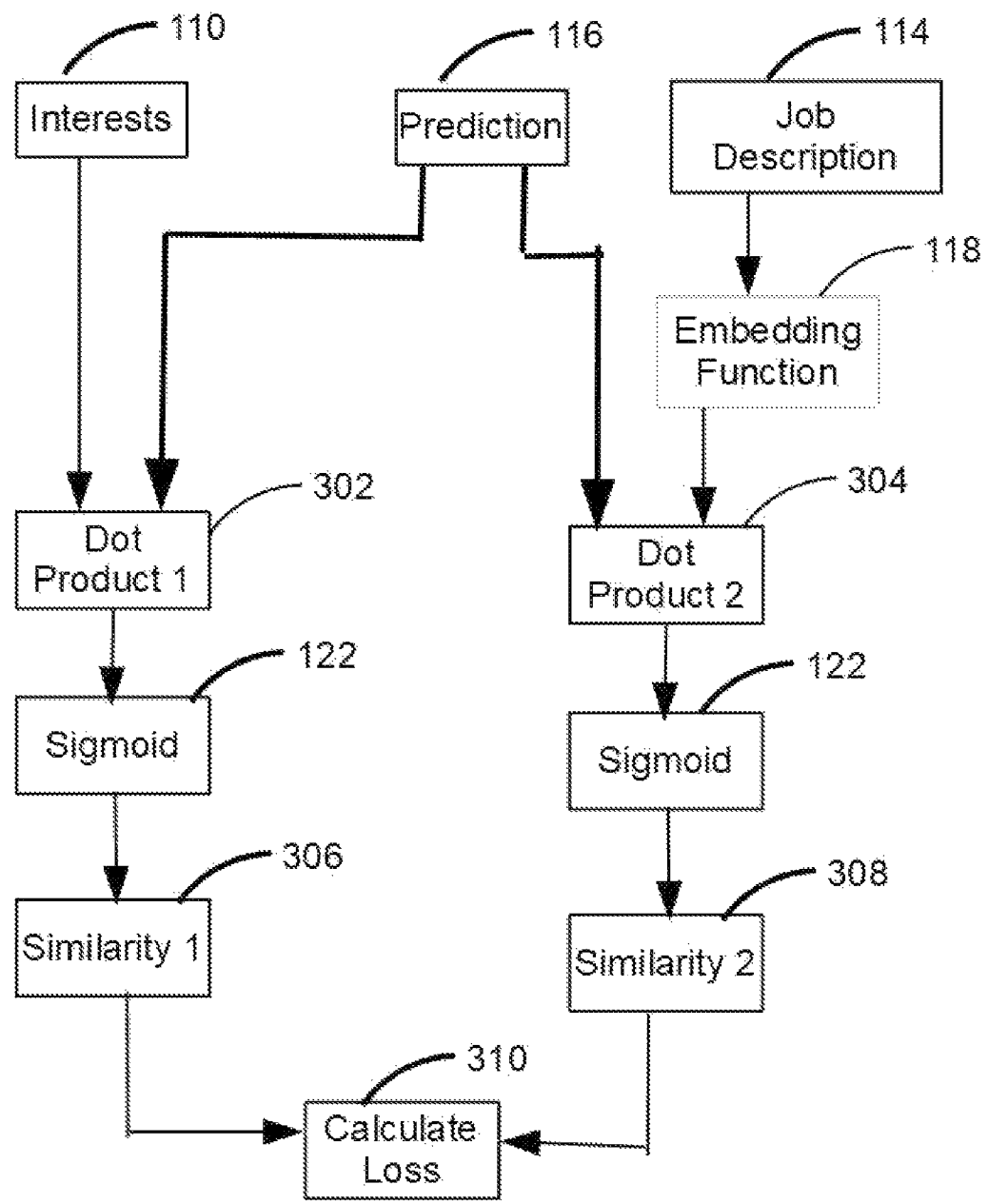
FIG. 3 shows one or more embodiments of how the system trains the weights for the interests and job descriptions based on the predictions of the job titles.

In one or more embodiments, we can improve the weights around interest and job description data by leveraging the prediction output of the model 116. As shown in FIG. 3, a first dot product 302 of the interests 110 and the prediction 116 is put through a sigmoid function 122 to produce a first similarity vector 306. A second dot product 304 of the prediction 116 and embedding function output 118 of the job description data 118 is put through a sigmoid function 122 to produce a second similarity vector 308. The weighted sum of the two similarity values is the total prediction loss value 310 the network will minimize during training using backpropagation to adjust the weights.

Figure 5:
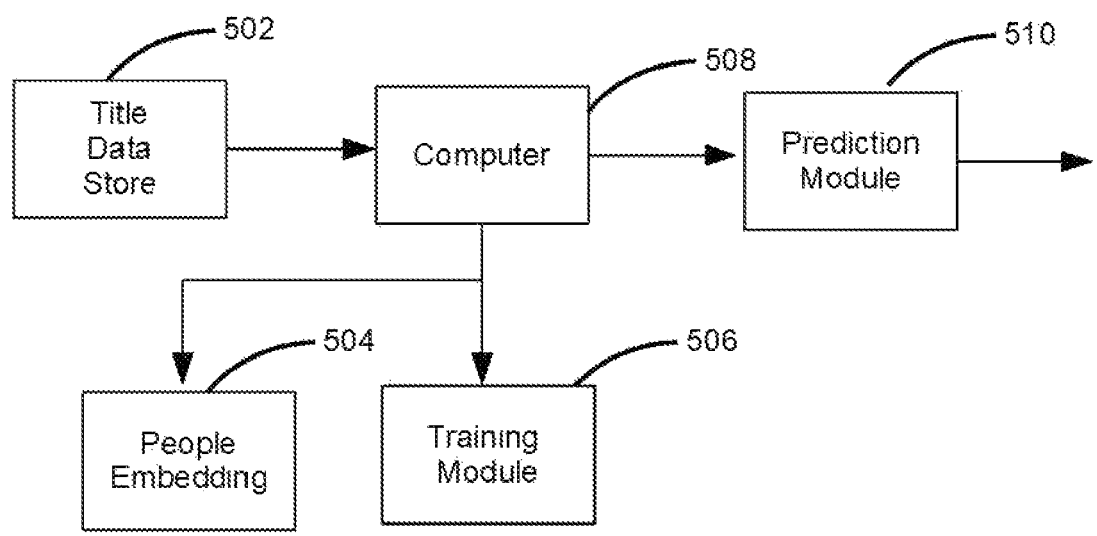
FIG. 5 shows one or more embodiments of the physical system associated with this invention.

FIG. 5 shows one or more embodiments of the physical system. A computer 508 is coupled to a title data store module 502. The title data store module 502 is configured to accept title, corporate entity, job description and interest data. In one or more embodiments, the Training Module 506 is coupled to the computer 508, the Training Module configured to accept data from the Title Data Store 502 and generate the prediction model parameters as shown in FIG. 1, along with the interests and job description weights as shown in FIG. 3.

The Prediction Module 510, coupled to the computer 508, is configured to accept prediction model parameters from the Training Module 506 along with title data associated with two roles and calculate a similarity value, as shown in FIG. 2.

In one or more embodiments, a People Embedding Module 504 is coupled to the computer, configured to accept and store the output of the concatenation stage 108 and associate it with a specific title at a specific corporate entity. In one or more embodiments, the People Embedding Module accepts requests to return similar titles based on a given threshold from a measure of distance from a given title at a corporate entity. In one or more embodiments, that distance is the Euclidian distance. In other embodiments, that distance is the cosine similarity function. In one or more embodiments, the People Embedding Module accepts requests to compare two titles associated with the same or different corporate entities, and returns the difference.

FIG. 4 shows a flow for production of the interests data. Structured data sources 402 such as employee profile information is parsed to find interest values. Job description data 114 is passed through a keyword extractor 404 to produce interest data. The concatenation of the two produces the interest data used in the model 406.

What is claimed is:

1. A system for determining the relationship between two job titles at one or more companies, the system comprising:
   a computer,
   a title data store, coupled to the computer, configured to accept title, corporate entity, job description and interest data,
   a training module, coupled to the computer, configured to describe a neural network, configured to accept input data from the title data store, calculate or generate a set of coefficients and a set of title vectors for the neural network from the input data, and store the coefficients into a database, and
   a prediction module, coupled to the computer, configured to accept a first title, a first corporate designation data, a second title and a second corporate designation data, configured to accept the coefficients from the training module, and calculate the similarity between the first title and second title, wherein at least one of the title vectors in the set of title vectors is based on an association of words within the job description in the input data with a weight that is adjusted based on backpropagation as a function of a relationship between said at least one title vector and a known title vector.

2. The system described in claim 1, further comprising a People Embedding Module, the People Embedding Module coupled to the computer, configured to accept data from the training module and one or more titles and return similar titles.

3. A method for determining the relationship between two job titles at one or more companies, the method using:
   a computer,
   a title data store, coupled to the computer, configured to accept title, corporate entity, job description and interest data,
   a training module, coupled to the computer, configured to describe a neural network, configured to accept input data from the title data store, calculate or generate a set of coefficients and a set of title vectors for the neural network from the input data, and store the coefficients into a database, and
   a prediction module, coupled to the computer, configured to accept a first title, a first corporate designation data, a second title and a second corporate designation data, configured to accept the coefficients from the training module, and calculate the similarity between the first title and second title,
   the method comprising:
   accepting title data from an external data source,
   calculating a set of coefficients from said title data,
   accepting a title,
   processing said title against said set of coefficients, and returning a set of similar titles,
   wherein at least one of the title vectors in the set of title vectors is based on an association of words within the job description in the input data with a weight that is adjusted based on backpropagation as a function of a relationship between said at least one title vector and a known title vector.

4. The system of claim 1, wherein:
   the title data store includes memory circuitry that stores the title, corporate entity, job description and interest data;
   the training module includes circuitry and instructions that, when executed by the computer, calculates the set of coefficients for the neural network and stores the coefficients in the database; and
   the prediction module includes circuitry and instructions that, when executed by the computer, calculates the similarity between the first title and the second title.

5. The system of claim 1, wherein the training module is configured to generate the coefficients by creating title vectors based on the input data, each title vector being indicative of a relationship between the title and corporate designation data.

6. The system of claim 5, wherein the training module is configured to concatenate each title vector with a vector representing the corporate designation data to generate a single concatenated vector represented by the coefficients.

7. The system of claim 5, wherein the training module is configured to generate the coefficients by, for each title vector:
   associating words within the job description in the input data with a weight,
   comparing a the title vector to a known title vector, and adjusting the weight associated with the words via backpropagation, based on the comparing.

8. The system of claim 1, wherein the prediction module is configured to calculate the similarity between the first title and the second title by determining whether the first title and the second title are semantically similar based on the first title, the second title, and the coefficients.

9. The system of claim 1, wherein the prediction module is configured and arranged with the training module to calculate the similarity between the first title and the second title by determining a dot product for interests associated with the first title and data associated with the job description and passing the dot product through a sigmoid function to produce a similarity value.

10. The system of claim 1, wherein the prediction module is configured and arranged with the training module to calculate the similarity between the first title and the second title by:

for each of the first and second titles,
embedding the title using an embedding function and concatenating an output of the embedding function the corporate designation associated with the title, therein producing a single output vector for each title;
predicting a role associated with the title using a classifier; and
comparing the predicted roles for the first and second titles using a similarity function.

11. The system of claim 10, wherein comparing the predicted roles for the first and second titles using a similarity function includes determining a Euclidian distance between vectors representing the predictions.

12. The system of claim 10, wherein comparing the predicted roles for the first and second titles using a similarity function includes determining a cosine similarity between the vectors representing the predictions.

13. The system of claim 1, wherein the prediction module is configured and arranged with the training module to calculate the similarity between the first title and multiple titles, and to return a set of titles from the multiple titles that match the first title.

14. The method of claim 3, wherein:
the computer includes circuitry;
the title data store includes memory circuitry that stores the title, corporate entity, job description and interest data;
the training module includes circuitry and instructions that, when executed by the computer, calculates the set of coefficients for the neural network and stores the coefficients in the database; and
the prediction module includes circuitry and instructions that, when executed by the computer, calculates the similarity between the first title and the second title.

15. The method of claim 3, further comprising using the computer, title data store, training module and prediction module to calculate the set of coefficients by:
creating title vectors based on the input data, each title vector being indicative of a relationship between the title and corporate designation data, and
generate a single concatenated vector represented by the coefficients by concatenating each title vector with a vector representing that title vector's corporate designation data.

16. The method of claim 15, wherein using the computer, title data store, training module and prediction module to calculate the set of coefficients includes, for each title vector:
associating words within the job description in the input data with a weight,
comparing a the title vector to a known title vector, and
adjusting the weight associated with the words via back-propagation, based on the comparing.

17. The method of claim 3, wherein processing said title against said set of coefficients includes determining whether the accepted title is semantically similar to titles in the title data store based on the titles and the coefficients.

18. The method of claim 3, wherein
processing said title against said set of coefficients includes determining a dot product for interests associated with the accepted title and data associated with a job description for the accepted title, and passing the dot product through a sigmoid function to produce a similarity value; and
returning the set of similar titles includes returning the similar titles based upon the similarity value.

* * * * *